United States Patent [19]

Richardson et al.

[11] Patent Number: 4,679,233
[45] Date of Patent: Jul. 7, 1987

[54] MICROPHONE

[75] Inventors: Charles P. Richardson, Coral Springs; Virgil Kuhl, Lauderhill; Bernard Gasparaitis, Tamarac; Bruce Staple, Coral Springs; Larry M. Krieg, Lauderhill, all of Fla.

[73] Assignee: Motorola, Inc., Schaumburg, Fla.

[21] Appl. No.: 771,097

[22] Filed: Aug. 30, 1985

[51] Int. Cl.⁴ .................. H04B 1/38; H01Q 1/22; H01Q 1/24
[52] U.S. Cl. .................. 379/433; 343/702; 379/451; 455/89; 455/90
[58] Field of Search .................. 179/102, 103, 121 R, 179/121 D, 146 R, 146 E, 179, 100 L, 184; 381/87, 88, 63, 64; 455/73, 77, 82, 83, 89, 90, 91, 95, 107, 120, 121; 343/701, 702, 720; 379/433, 451

[56] References Cited

U.S. PATENT DOCUMENTS

| | | | |
|---|---|---|---|
| 2,561,320 | 7/1951 | Stone et al. | 381/91 |
| 2,709,723 | 5/1955 | Breisch et al. | 381/168 |
| 2,745,508 | 5/1956 | Vadersen | 379/454 |
| 3,484,736 | 12/1969 | Wyse | 339/61 M |
| 3,611,255 | 10/1971 | Shroyer | 339/60 R |
| 3,693,089 | 9/1972 | Hutchinson et al. | 455/351 |
| 3,736,591 | 5/1973 | Rennels et al. | 343/702 |
| 3,778,836 | 12/1973 | Tanaka | 343/702 |
| 3,789,166 | 1/1974 | Sebesta | 381/205 |
| 3,987,258 | 10/1976 | Tsutsui et al. | 381/159 |
| 3,995,125 | 11/1976 | Cypser | 381/205 |
| 4,032,844 | 6/1977 | Imazeki | 379/440 |
| 4,136,265 | 1/1979 | Cote | 381/91 |
| 4,154,496 | 5/1979 | Gallagher | 339/89 R |
| 4,198,601 | 4/1980 | Ono et al. | 455/73 |
| 4,199,721 | 4/1980 | Ono et al. | 381/168 |
| 4,225,970 | 9/1980 | Jaramillo et al. | 455/90 |
| 4,389,081 | 6/1983 | Gallusser et al. | 339/89 M |

FOREIGN PATENT DOCUMENTS

| | | | |
|---|---|---|---|
| 55-7812 | 6/1957 | Belgium | 455/90 |
| 1223423 | 8/1966 | Fed. Rep. of Germany | 179/179 |
| 54-114066 | 9/1979 | Japan | 343/702 |
| 55-112046 | 8/1980 | Japan | 455/95 |
| 59-77724 | 5/1984 | Japan | 455/95 |
| 2021352 | 11/1979 | United Kingdom | 179/184 |

Primary Examiner—Gene Z. Rubinson
Assistant Examiner—Danita R. Byrd
Attorney, Agent, or Firm—Daniel K. Nichols; Joseph T. Downey; Anthony B. Sarli

[57] ABSTRACT

This microphone includes a microphone element, speaker and antenna all internal to the microphone housing. These components are carried by a chassis that is fastened to the microphone body at its lower end which also provides the effective attachment point for the microphone cable. The speaker is mounted in the chassis at an angle having its face slight upwardly incline to project sound towards the top of the microphone. An antenna element includes walls on either side of the speaker for reflecting sound upwardly. The antenna element has apertures in its top portion to allow for the passage of sound therethrough. The microphone element is also in a position for picking up sound through the top of the microphone.

15 Claims, 5 Drawing Figures

MICROPHONE

BACKGROUND OF THE INVENTION

This invention relates to microphones generally and in particular, to microphones which incorporate a speaker and an antenna. Combination microphone, speaker, and antenna units are well known in the art. Such units are generally referred to as public safety microphones as they typically find use with public service agencies. Typically, such microphones are worn on the chest and are connected to portable radios which are at belt level. Such units typically include a stubby type antenna extending from the top of the microphone and typically have both speaker and microphone grill positioned on the front of the microphone. As the sound from such units is not directed upward at the user's head, it is typically necessary to utilize a higher volume out of the speaker than would be required if the speaker was pointed upward. Furthermore, such units can be cumbersome from the standpoint of the antenna which can get in the user's way.

SUMMARY OF THE INVENTION

This speaker, antenna, and microphone presents a low profile and compact package with the antenna mounted inside the microphone housing and provides means for porting sound from the speaker through the antenna and out of the top of the microphone housing. The speaker, antenna, and microphone assembly includes a housing having a top sound port. A microphone cartridge or element, speaker means, and an antenna element are all mounted in the housing. The antenna element is positioned to reflect sound from the speaker toward the top sound port.

In one aspect of the invention, the antenna element includes a ground plane having a front surface position in front of the speaker, a rear surface position behind the speaker, and a top surface interconnecting the front and rear surfaces. The ground plane top surface includes a plurality of holes or perforations for passing sound waves. The microphone element is located below the ground plane top surface.

In another aspect of the invention, a second antenna element is located within the housing above the ground plane top surface. In still another aspect of the invention, the housing includes a grill assembly having a top grill and having means for preventing water from entering the housing through the top grill. The preventing means includes a pitched roof structure located below the top grill; this structure is covered with a membrane for passing sound while being water impermeable.

In one aspect of the invention, a chassis is located within the housing. A speaker is mounted within the chassis at angle from vertical. An antenna is carried by the chassis and has front and rear vertical walls and sound is reflected by one of the antenna walls.

In another aspect of the invention, the chassis includes a lower neck portion and the housing includes a lower opening receiving the neck portion. Fastening means engage the neck portion for fastening the chassis within the housing. In one aspect, the neck portion is threaded and the fastening means includes a threaded nut for engaging the threaded neck portion.

In another aspect of the invention, the threaded nut includes a second threaded portion and a cable connector is connected to this second threaded portion. In still another aspect of the invention, the cable connector includes a threaded bushing which threadably engages the second threaded portion. The bushing is constructed of resilient material so as to release its threaded connection when a predetermined force is applied along the axis of its threads. In another aspect of the invention, the threaded bushing comprises a continuous thread.

DESCRIPTION OF THE PREFERRED EMBODIMENT

Figure 5:
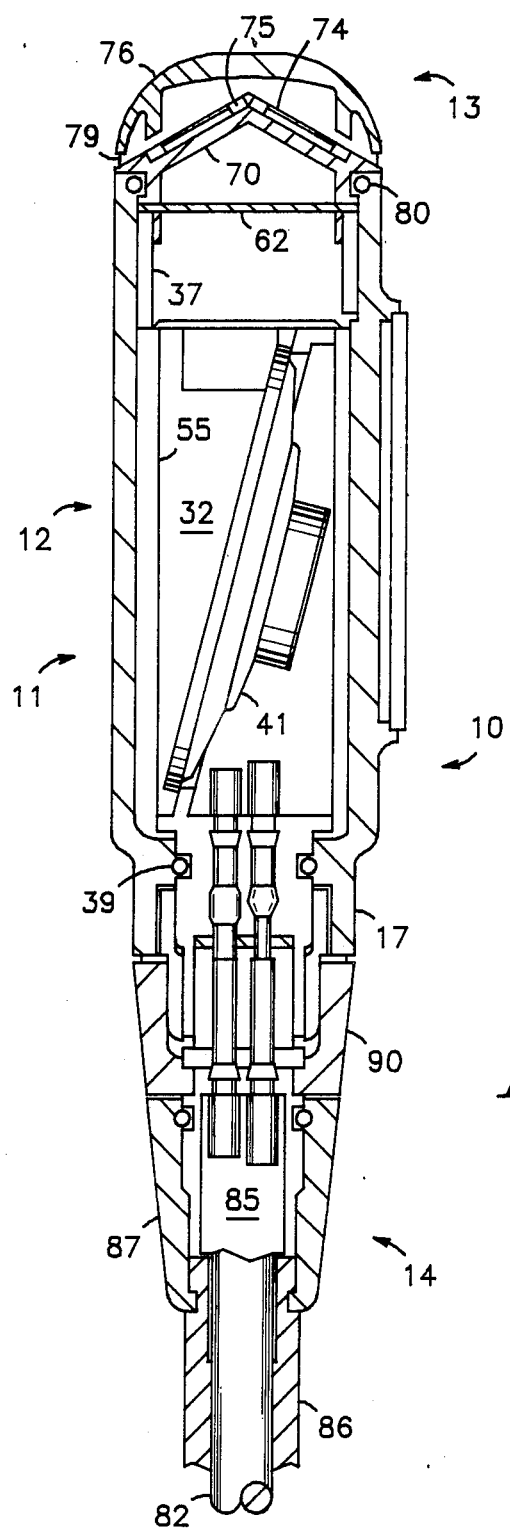
FIG. 5 is a cross-sectional view of the microphone assembly.

Referring now by characters of reference to the drawings, and first to FIG. 5, it will be understood that the microphone 10 is comprised of various assemblies. A housing assembly 11 holds a chassis assembly 12 with the top of the housing assembly being closed by a grill assembly 13. A cable assembly 14 is connected to the housing assembly 11 at its lower end. Each of these assemblies, 11 through 14, will now be discussed in further detail in regard to the other drawing figures.

Figure 1:
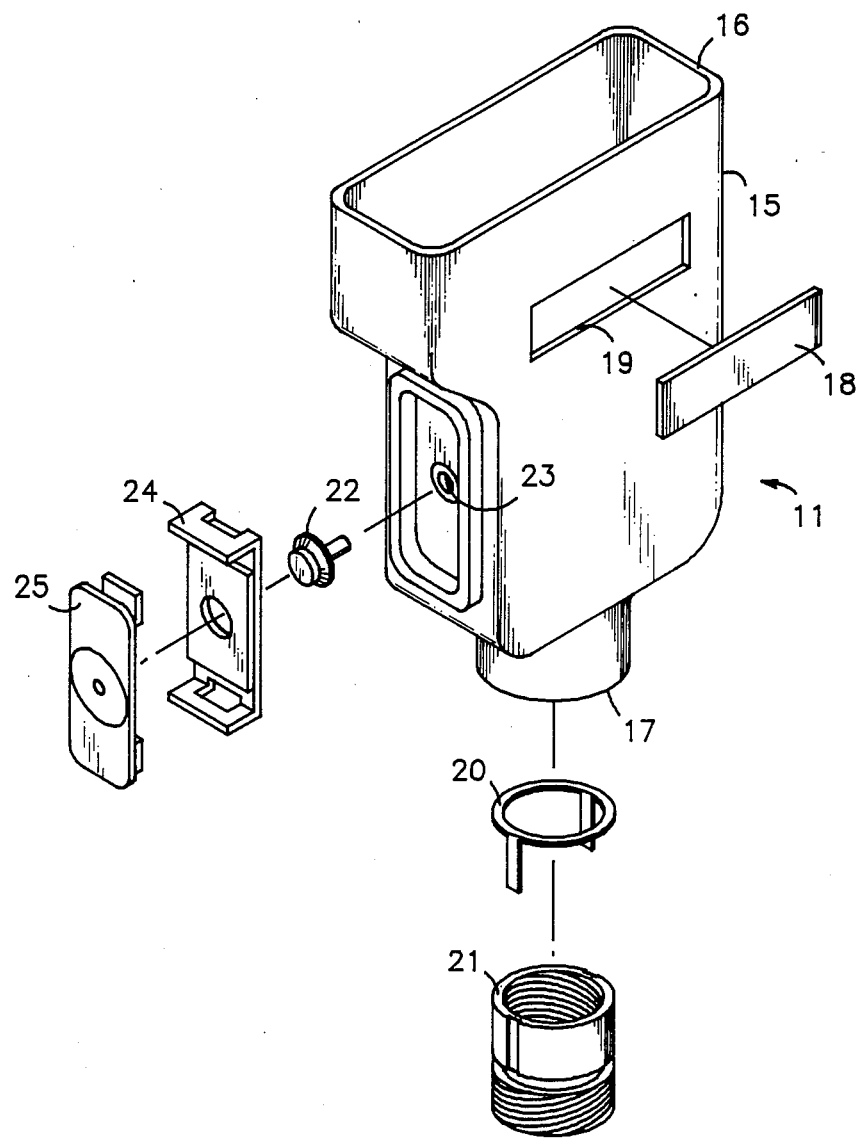
FIG. 1 is an exploded view of the housing assembly.

The housing assembly 11, shown in FIG. 1, includes a molded housing body 15, a substantially rectangular open upper margin 16 and a circular lower opening 17 providing a lower margin. A washer 20, and portions of the thread bushing or nut 21, are received within the lower margin 17. A label 18 can be attached to the front of the body 15 at a recessed area 19. A switch actuator 22 is received through a housing opening 23 and is held in postion by actuator bracket 24 which also retains the actuator panel 25.

Figure 2:
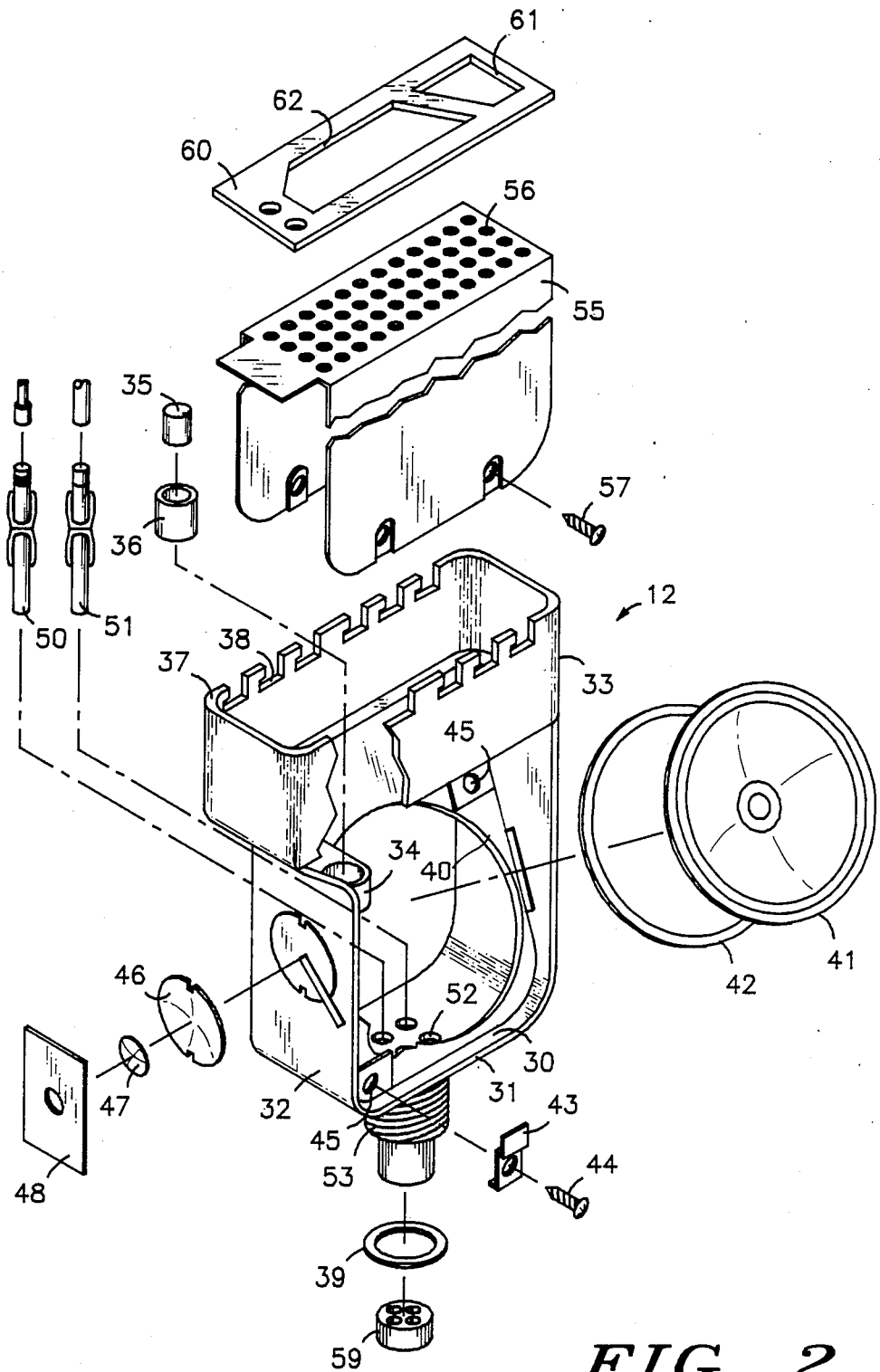
FIG. 2 is an exploded view of the chassis assembly.

Referring now to FIG. 2, it will be understood that the chassis assembly 12 includes a chassis 30 having a lower wall 31 and opposed sidewalls 32 and 33 which in cooperation with the lower wall 31 define a substantially U-shaped configuration. Inside of the wall 32, adjacent to its top, a mounting portion 34 is configured to receive a microphone element or cartridge 35 and its holder 36.

A rectangular open top structure 37 is provided on the chassis 30 along the tops of walls 32 and 33 and spanning between the walls. The top structure 37 includes notches 38 which are configured to receive the grill assembly 13. Mounted within the chassis 30 is a speaker mounting wall 40 which, rather than being vertical, is inclined so that a mounted speaker will project outwardly and upwardly. A speaker 41 constituting speaker means, with its resilient seal 42 are fastened to the inclined wall 40 by a pair of brackets 43 and screws 44 which are received in the holes 45.

The push-to talk switch assembly 46, contact 47, and mounting cover 48 are located on the sidewall 32. Various conventional contacts, such as coaxial contacts 50 and 51, are receivable in openings 52 located in the lower wall 51 for providing a connector. The contacts 50 and 51 extend through a lower wall threaded neck portion 53 which is utilized for mounting the assembly. A seal 39 is received about the neck portion 53 adjacent to the lower wall 31, while a socket seal 59 is received within the neck portion 53.

An inverted U-shaped antenna ground plane element 55 is received within the chassis 30 between the sidewalls 32 and 33 with its front and back walls being disposed on opposed sides of the speaker wall 40. The ground plane element is constructed of high density material for sound reflection purposes. In the preferred embodiment, it is metal, being constructed of sheet copper with bright finish tin plating. If desired a cushion of flexible rubber-like material (not shown) can be applied to the outside of the walls of the antenna element 55. A plurality of aperatures 56 are loaded in the top portion of the antenna ground plane 55. Screws 57 are utilized to attached sidewall portions to the chassis 30. An antenna radiating element 60, which in the preferred embodiment is constructed on a PC board, includes apertures 61 and 62 and appropriate circuit traces (not shown) as required for the desired frequency of operation. The radiating element 60 is located in spaced relation to the top portion 56.

Figure 3:
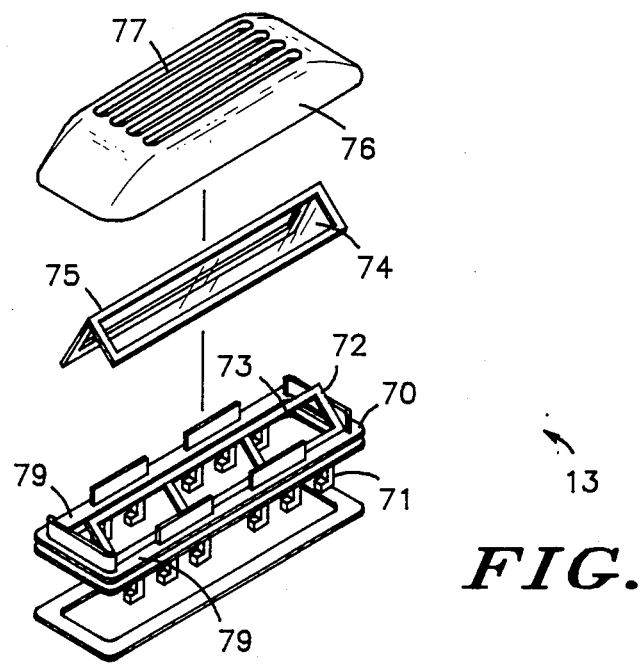
FIG. 3 is an exploded view of the grill assembly.

Referring now to FIG. 3, it will be seen that the grill assembly 13 includes a base portion 70 having a lower margin 71 designed to mate with the notches 38 of the chassis 30. The base 70 includes a peaked roof 72, having a plurality of aperatures 73. Both sides of the roof 72 are covered by a membrane 74 held in place as by double sided margin tape 75. A grill 76, having a plurality of slots 77, attaches to the base 70 to cover the roof 72. A plurality of side openings 79 are provided in the grill assembly 13 to allow for the run off of any water entering through the grill slots 77.

As shown in FIG. 5 an O-ring 80 is used as a seal between the grill assembly base 70 and the housing upper margin 16. The chassis assembly 12 has its threaded neck 53 extending into the lower opening 17 of the housing assembly 11. Threaded bushing 21 engages the threaded neck 53 in order to mount the chassis assembly 12 within the housing body 15. The threaded bushing 21 further provides a threaded connection for mounting cable assembly 14 for connecting the cable assembly.

Figure 4:
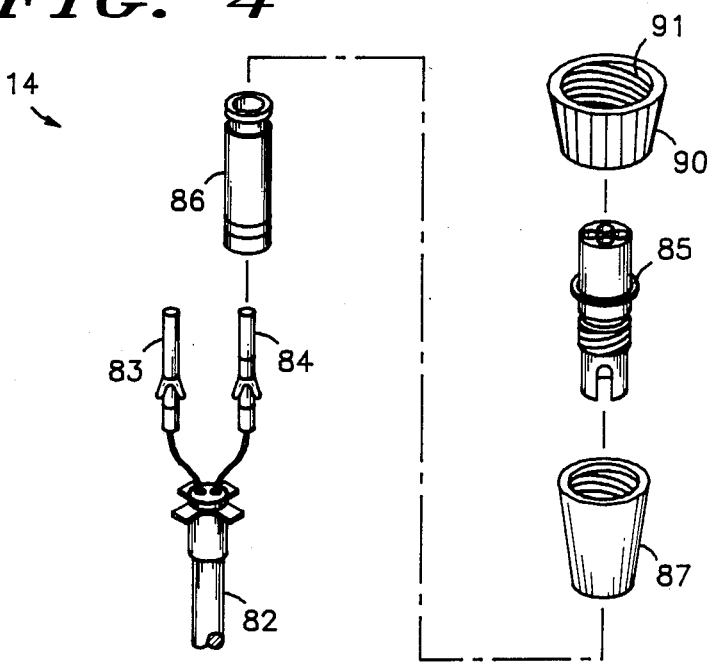
FIG. 4 is an exploded view of the cable assembly.

As illustrated in FIG. 4, cable assembly 14 includes a cable 82 having contacts, such as coaxial contacts 83 and 84, which are designed to mate with the coaxial contacts 50 and 51. These contacts are received through openings of a cable bushing 85 and held in place by the sleeve 86 and attachment threaded member 87. A bushing 90, formed of resilient material, is used for engagement with the bushing 21. It will be understood that the bushing 90 which includes continuous threads 91 is provided to allow a break-away connection in the event excessive force is applied to the cable 82.

It is thought that the structural features and functional advantages of the microphone assembly have become fully apparent from the foregoing description of parts, but for completeness of disclosure a brief description of the operation of the microphone will be given.

The microphone element 35 and antenna elements 55 and 60 as well as speaker 41 are all carried by the chassis 30. The chassis neck portion 53 provides not only for the mounting of the chassis 30 in the housing body 15, but also, effectively for the electrical and mechanical mounting of the cable assembly 14. The grill assembly interlocks with the chassis 30 and when the chassis 30 is in position in the body 15, the grill assembly 13 is locked in position.

The microphone element 35 has its pick-up pattern oriented in the direction of the top of the microphone in order to pick up sound waves through the grill 76 and antenna element 60 and antenna element 55. Sound waves from the speaker 41 are reflected and baffled upwardly by the walls of antenna element 55 through the holes 56 and the holes 61 and 62 of the antenna element 60 and through the grill assembly 13.

The connector assembly 14 will break away from bushing 21 when a predetermined force is applied to the cable 82 to prevent damage to the microphone 10.

What is claimed is:

1. A speaker, antenna and microphone assembly comprising,
   a housing having a top sound port,
   a microphone element mounted within the housing,
   a speaker means mounted within the housing, and
   an antenna element mounted within the housing including a surface positioned in front of the speaker to reflect sounds from the speaker toward the top sound port.

2. A speaker, antenna and microphone assembly comprising,
   a housing having a top sound port,
   a microphone element mounted within the housing,
   a speaker means mounted within the housing, and
   an antenna element mounted within the housing and positioned to reflect sounds from the speaker toward the top sound port, the antenna element including a ground plane element having a front surface positioned in front of the speaker, a rear surface positioned behind the speaker and a top surface interconnecting said front and rear surface.

3. The assembly of claim 2, wherein the ground plane top surface includes a plurality of holes for passing sound.

4. The assembly of claim 3, wherein the microphone element is located below the ground plane top surface.

5. The assembly of claim 4, wherein a second antenna element is located within the housing above the ground plane top surface.

6. The assembly of claim 5, wherein the housing includes a grill assembly having a top grill and having means for preventing water from entering the housing through the top grill.

7. The assembly of claim 6, wherein said preventing means includes a pitched roof structure located below said top grill, said structure being covered with a membrane for passing sound while being water impermeable.

8. A speaker, antenna and microphone assembly comprising,
   a housing having a top opening,
   a chassis within said housing,
   an antenna element carried by the chassis and having front and rear vertical walls,
   a speaker mounted within said chassis at an angle from vertical,
   wherein sound from said speaker is reflected through the housing top opening by one of said antenna walls.

9. The assembly of claim 8, wherein the antenna includes an upper wall interconnecting the front and rear walls, and including a plurality of openings for passing sound.

10. The assembly of claim 9, wherein a microphone element is located below the antenna top wall.

11. The assembly of claim 9, wherein the chassis includes a lower neck portion, the housing includes a lower opening receiving said neck portion, and fastening means engage the neck portion for fastening the chassis within the housing.

12. The assembly of claim 11, wherein the neck portion is threaded, and the fastening means includes a threaded nut for engaging the threaded neck portion.

13. The assembly of claim 12, wherein the threaded nut includes a second threaded portion, and
a cable connector is connected to the second threaded portion.

14. The assembly of claim 13, wherein the cable connector includes a threaded bushing threadably engaging the nut second threaded portion, the threaded bushing being constructed of resiliently flexible material so as to release its threaded connection when a predetermined force is applied along the axis of its threads.

15. The assembly of claim 14, wherein the threaded bushing comprises a continuous thread.

* * * * *